Figure 1:
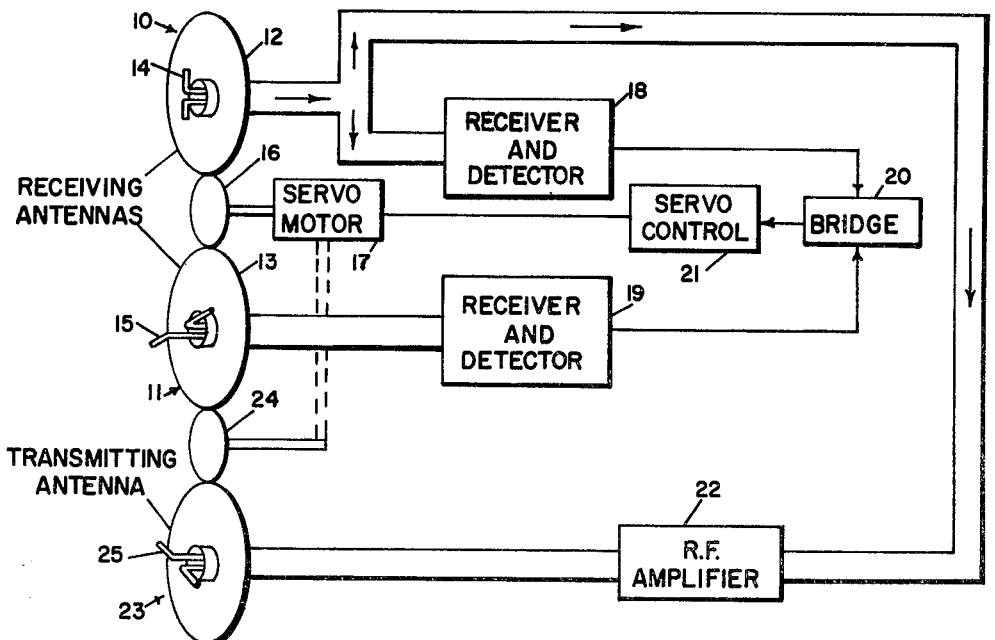

INVENTOR.
JESSE L. BUTLER
BY
Robert O. Richardson
ATTORNEY

United States Patent Office

3,171,125
Patented Feb. 23, 1965

3,171,125
RADAR COUNTERMEASURES ANTENNA SYSTEM
Jesse L. Butler, Nashua, N.H., assignor to Sanders Associates, Inc., Nashua, N.H., a corporation of Delaware
Filed Oct. 5, 1961, Ser. No. 143,117
8 Claims. (Cl. 343—18)

The present invention relates in general to systems for countering the effectiveness of hostile radar apparatus and, more particularly to electronic countermeasures systems for the deception of interrogating monopulse tracking radar systems.

The so-called monopulse tracking radar system provides electronic means for the acquisition of data on the range, azimuth and elevation of remote objects for the purpose of navigation or detection of enemy targets in wartime. Such systems sometimes referred to as simultaneous lobe switching radars, employ plural antenna elements spaced apart a predetermined distance. Pulsed microwave energy signals are radiated in a directive manner such that an overlapping region is defined in the overall radiation pattern. A target to the right or left of the overlapping regions reflects energy differing in phase angle and amplitude between the respective antenna elements. In addition, targets above or below the overlapping region reflect energy differing similarly. Electronic means compare the varying responses to produce output signals equal to the sum of the amplitudes of the energy received by the antenna elements, as well as, amplitude differences between reflected signals from the right or left and above or below the overlapping region. The amplified sum and difference signals are coupled to azimuth and elevation receivers together with accompanying indicator means. The amplitude and polarity of the output signals from the respective receivers thus indicate the specific target information desired.

Due to advances in the accurate detection and tracking of targets brought about by improvements in monopulse radar systems, it becomes increasingly important to advance the state of the electronic countermeasures art to deny accurate information, particularly in wartime, to such radar systems. In the field of countermeasures, the methods employed to deceive enemy radar systems may be categorized, roughly, into active and passive techniques.

A primary example of the passive technique involves the use of large quantities of metallic foil strips (sometimes referred to as chaff) to create a false target. Deception of monopulse radar systems, however, is limited due to the inability of the chaff to move at a continuous rate compatible with real targets. An example of the so-called active technique in the countermeasures art involves pin-pointing the site of an interrogating monopulse radar system. Upon determination of the exact angular location, pulses from two separate countermeasures antenna systems may be radiated to produce a phase discontinuity in the aperture of the searching monopulse radar antenna system. Since this method requires multiple antenna systems, as well as, rapidly attainable information to be effective its use in wartime is rather limited. Further, such a method is only of value for short range use which introduces another limiting factor.

The present invention, therefore, has for its primary object the provision of a new and unique active countermeasures system to be carried in a vehicle, such as an aircraft or space craft, for the deception of hostile monopulse radar systems having the vehicle under surveillance.

A further object of the invention is to provide a radar countermeasures system arranged to determine the polarization of interrogating radar signals and to transmit deceptive signals to the interrogating monopulse radar system to cause that radar system to give false information.

Figure 2:
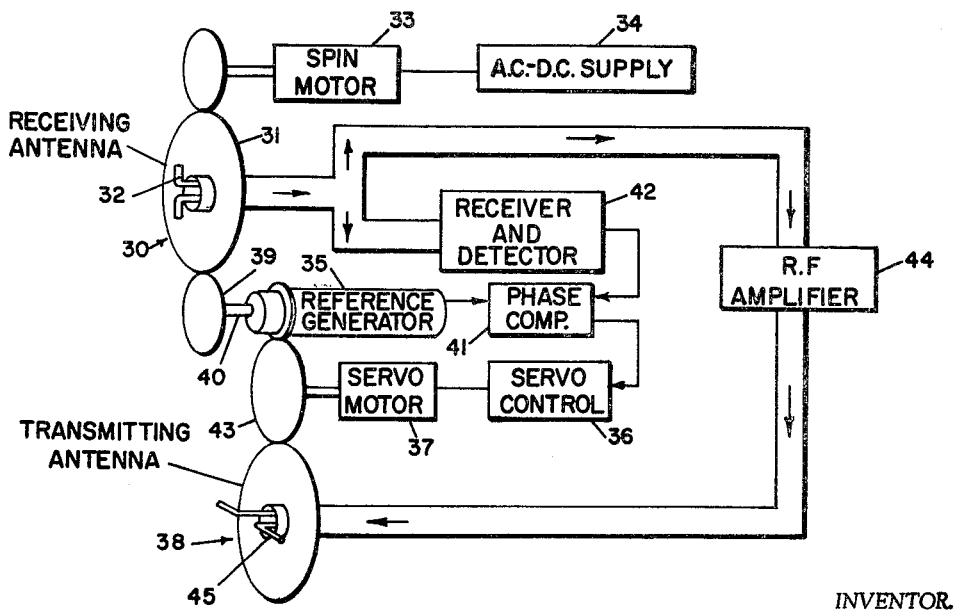

Other objects, features and advantages will become apparent after consideration of the following detailed specification together with the appended drawings, in which:

FIG. 1 is a schematic circuit diagram of the preferred embodiment of the invention; and FIG. 2 is a schematic diagram of an alternative embodiment of the invention.

*General description*

The technique employed in the present invention warrants consideration of the basic characteristic of the monopulse radar system. In such systems the antenna elements, comprising lenses, paraboloids, horns and the like, simultaneously radiate waves which are horizontally and vertically polarized to provide a resultant symmetrical beam. The overall pattern comprises a large number of very narrow lobes. For horizontally polarized waves the pattern maxima points occur at the odd-integral lobe distributions while the minima occur at the even-integral lobes. In the case of vertically polarized waves the positions of maxima and minima are reversed. Monopulse radar systems rely on echo pulses from targets in varying amplitudes and phase relationships to determine a target's angular position with respect to the location of the system's energy radiators. As a result the antenna elements of the system are pivotally mounted for movement in azimuth and elevation. Echo pulses from a target are used by the monopulse system to obtain error signals which cause mechanisms to rotate and elevate the antenna elements until a null is reached at which time the antenna is "on target." Indicators then give a reading for the angular data pertaining to the target's azimuth or elevation. The antenna elements which receive reflections of the radiated polarized pulsed signals are designed to be responsive when illuminated by wave energy having a preferred polarization. Where a deceptive signal is established to mask the normal radar return, and the deceptive signal is cross polarized relative to the normal radar return, the sum and difference responses in the amplitude of the signals received by the radar, which indicate the target's azimuth and elevation, become completely reversed. As a result, the interrogating radar system, in attempting to correct its antenna position to "null" the return from the target, will correct for errors in elevation by changes in azimuth and vice versa. For a comprehensive discussion of monopulse radar systems, the reader is referred to the book entitled Introduction to Monopulse by Donald R. Rhodes, published by McGraw-Hill.

*Countermeasures radar system*

In accordance with the teachings of the invention, there is provided antenna means for receiving signals radiated by an interrogating monopulse radar system, means for detecting the polarization characteristics of the signals received, and means for transmitting deceptive responses. The deceptive signal is radiated by a transmitting antenna which is oriented to cause its radiated signal to be polarized transversely to the plane of the polarization of the received signals. As a result, a cross-polarized false radar return is transmitted to the interrogating radar system to produce the reversal of the sum and difference patterns previously mentioned.

Referring to FIG. 1, one embodiment of the invention will be described.

A pair of rotatably mounted receiving antennas 10, 11 of conventional design comprising wave energy reflectors 12, 13 and dipole elements 14, 15 are controlled by a common drive mechanism 16 and servo motor 17. The antenna dipole elements are oriented as shown to result in detection of both horizontally and vertically polarized signals. While specific polarized receiving antenna elements have been illustrated, it is noted that any suitable means may be employed, such as open wave guides and the like. The receiving antennas 10, 11 are maintained in a manner such that their planes of polarization remain fixed relative to each other. As the antennas are rotated, polarized signals from the interrogating monopulse radar system will be strongly received by the antenna nearest in polarization thereto while the other antenna will be less responsive. The incoming signals are coupled from each antenna to separate receiver-detector units 18, 19. The output signals from each receiver-detector are in turn fed to a bridge 20 which governs the servo control 21. The servo control, in turn, governs servo motor 17. The rotation of antennas 10 and 11 is thus controlled to cause those antennas to assume positions where the strength of the incoming signals from both antennas are equal. At that time, the bridge 20 is balanced and the antennas cease to rotate. Inasmuch as the angular relationship between the receiving antennas is fixed, the plane of polarization of the interrogating signals may be determined simply by ascertaining the plane bisecting the angle of the polarizations of the receiving antennas 10 and 11. This information may be indicated visually by suitable means within the realm of the electronic art.

A portion of the signal output from one of the receiving antennas, for example, the antenna 10, is fed to a radio frequency amplifier, such as a traveling wave tube, which in turn furnishes the transmitting antenna 23 with a signal of sufficient amplitude to approximate a normal target return to the interrogating radar system. Transmitting antenna 23 is mounted in a manner permitting it to rotate and is geared to the receiving antennas by means of a common drive mechanism 24 controlled by servo 17. Once the plane of polarization of the interrogating signals is determined, the transmitting antenna dipoles 25 is maintained at an angle such as to transmit a cross polarization return signal. An angle of approximately 90° to the known plane produces the desired deceptive effect. The false response, therefore, will be transmitted to deceive the interrogating system in accordance with the invention.

*Alternative countermeasures system*

A different embodiment of the invention is shown in FIG. 2. In that embodiment, a receiving antenna 30, comprised by a parabolic reflector 31 and a dipole 32, is continuously rotated by a drive motor 33 energized from a suitable A.-C. or D.-C. source 34. The receiving antenna 30 is spun at a rate of 1800 r.p.m., for example, about its axis.

Assuming the wave energy impinging upon dipole 32 is polarized in a plane, the dipole is most sensitive to that energy when the dipole has a preferred orientation relative to the plane of polarization and is least sensitive to that energy when the dipole is rotated 90° from the preferred orientation. It is, for example, well known that for maximum absorption of energy from an electromagnetic field, a half wave dipole should be located in the plane of polarization. This orientation places the dipole at right angles to the magnetic lines of force and parallel to the electric lines. Conversely, for minimum absorption of energy the half wave dipole should be located perpendicularly to the plane of polarization of the electromagnetic wave energy. As the dipole 32 rotates, therefore, the strength of the received signal coupled from the dipole to the receiver 42 rises and falls in a periodic manner at a rate determined by the number of revolutions of the dipole. In the example chosen, the antenna spins at 1800 r.p.m. so that the received signal strength is modulated at a rate of 30 cycles per second. The modulation is in the form of a sine wave having a frequency of 30 cycles per second. In receiver 42, that modulation is detected; that is, the radio frequency signal obtained from dipole 32 is detected to obtain the modulation envelope. The output of the detector in the receiver is a sine wave having a frequency of 30 cycles per second. The detected output is applied to a phase comparator 41 where the phase of that signal is compared with the phase of another signal obtained from a reference generator 35. The rotor of the reference generator is keyed to shaft 40. Shaft 40 is caused to rotate by gearing 39 in synchronism with and at the same number of revolutions as the dipole 32. The signal output of reference generator 35 is a sine wave having a frequency determined by the number of revolutions of the rotor. The output of the reference generator, under the assumed condition, is a sine wave signal having a frequency of 30 cycles per second. The reference generator is constructed so that its field windings can be shifted relative to the rotor to control the phase of the generator's output signal.

The phases of the two inputs to comparator 41 are compared by that device. As is conventional in such devices, the comparator provides a D.C. signal indicating the magnitude of the difference in phase between its two input signals. For a suitable phase comparator, sometimes termed a phase detector, see Air Force Manual 101–8 (entitled Fundamentals of Electronics), dated July 1, 1957, pages 500–501. Where the two input signals are in phase the comparator's signal is zero; that is, no output signal is furnished by the comparator.

The output of phase comparator 41 is applied to a servo control mechanism 36. Servo control 36 governs a servo motor 37 which drives a gearing arrangement, symbolically indicated in FIG. 2 by gear 43. Through that gearing arrangement the field windings of reference generator 35 and transmitting antenna 38 can be simultaneously rotated. In response to the output of phase comparator 41, servo control 36 makes servo motor 37 turn in a direction causing the phase of the reference generator's signal to be brought into phase with the detected signal from the output of receiver 42. When that in phase condition is attained, the phase comparator's output falls to zero and the servo motor 37 is halted by servo control 36. At this time, dipole 45 of transmitting antenna 38 has been turned so that it is oriented in a desired relationship to the plane of polarization of the signal received by antenna 30. Since the intent of the countermeasures system is to deceive the interrogating radar, gearing arrangement 43 is such that when the two input signals to comparator 41 are in phase, dipole 45 of the transmitting antenna is perpendicular to dipole 32 of the receiving antenna at the instant when rotating dipole 32 is at the position where it is most sensitive to the incident polarized wave energy.

A portion of the signal received by antenna 30 is fed to a radio frequency amplifier 44 where the signal is built up to the desired strength for reradiation by transmitting antenna 38. In order to remove the modulation imposed by the rotation of the receiving antenna, the signal from amplifier 44 can be limited in a conventional manner.

It should be understood that prior to reradiation, the signal from the receiving antenna, in the systems shown in FIGS. 1 and 2, can be altered in other ways, to deceive the foe's radar. For example, the received signal can be delayed before retransmission in order to provide false range information. The retransmitted signal, as another example, may be shifted in frequency to provide a spurious Doppler shift whereby an erroneous indication of the target's velocity is given.

The invention thus provides a countermeasures system for the return of a cross-polarized deceptive signal which will effectively reverse the normal responses in elevation and azimuth data expected in an interrogating tracking monopulse radar system. Since the countermeasures system disclosed may conveniently employ antennas and associated equipment used for other electronic countermeasuring procedures, no limitations in mobility are imposed. Several embodiments of the invention have been

What is claimed is:

1. A countermeasures system for the deception of a radar system of the type which transmits polarized electromagnetic energy, the countermeasures system comprising an electromagnetic energy radiator for radiating polarized waves, means for supplying to the radiator wave energy for transmission, and means for orienting the radiator to cause its radiated energy to be cross polarized relative to the polarization of a true radar return.

2. A radar countermeasures system for the deception of interrogating monopulse radar systems comprising means sensitive to wave energy for receiving interrogating pulsed signals, means for detecting the plane of polarization of the received interrogating signals, radiating means for radiating polarized wave energy, means connected between the receiving means and the radiating means for causing the radiating means to radiate a signal whose amplitude approximates a true reflection from a target of the interrogating signals, and means responsive to said detecting means for causing the plane of polarization of the radiating means to be perpendicular to the detected plane of polarization of the received interrogating signals.

3. A radar countermeasures system for the transmission of false and deceptive target return information to interrogating monopulse radar systems comprising a plurality of rotatable antennas for reception of interrogating pulsed signals, means causing the planes of polarization of the rotatable antennas to be fixed with respect to each other, separate receiver-detector means connected to each antenna, electrical balancing means connected to the output of each receiver-detector means to determine the strength of the received signals, means controlling the rotation of the antennas, the controlling means being responsive to the output of the balancing means connected thereto, the balancing means causing the antennas to be rotated until the strength of the respective received signals is substantially equal to thereby determine the plane of polarization of the received signals, a transmitting antenna having a radiator for radiating polarized wave energy, means for causing the plane of polarization of the radiator to be perpendicular to the determined plane of polarization of the received signals, and amplification means connected between one of said receiving antennas and said transmitting antenna to cause the radiator to produce an output signal whose amplitude approximates a true reflection from a target of the interrogating signals, said output signal being transmitted as a cross-polarized response to the interrogating signals.

4. In a radar countermeasures system for the deception of interrogating monopulse radar systems, an antenna system comprising a pair of rotatable receiving antennas polarized in a fixed angular relationship to each other, a common servo control mechanism, a transmitting antenna geared to said receiving antennas and adapted to be polarized in a differing angular relationship, the output of said receiving antennas being connected to means for detecting and balancing the strength of the signals received from each antenna, said balancing and detecting means actuating said control means to thereby determine the antenna positioning for equal signal strength and polarity of the received signals, said transmitting antenna being adjusted to a polarity perpendicular to the determined polarity of the received signals, and means for the amplification of a portion of the received signals connected to one of said antennas with the resultant output signal having an amplitude which approximates a normal radar target response, and means connecting said amplification means to said transmitting antenna to thereby transmit the output signal as a cross-polarized response.

5. A radar countermeasures system for the deception of interrogating monopulse radar systems comprising single polarized receiving antenna means; motor actuated driving means for continuously rotating said antenna means; signal detection means, electrical signal phase comparison means and a servo control means interconnected to each other, respectively and to the output of said antenna means to thereby record the electrical phase characteristic of incoming pulsed signals; a synchronous motor actuated device with the armature thereof geared to said antenna driving means to generate an electrical reference signal; the output of said synchronous reference device being connected to said phase comparison means to thereby record the phase characteristic of the revolving electrical field of the rotating antenna means; transmitting antenna means adapted to be polarized in a plane perpendicular to the plane of polarization of said receiving antenna means; said servo control mechanism being geared to said transmitting antenna means and the field adjustment means of said synchronous reference device to thereby adjust the displacement of said transmitting antenna means to the position of maximum incoming signal strength as determined by the point of coincidence of the phase characteristics of the respective signals fed to the phase comparison means; and means for the amplification of a portion of the incoming signals connected between said receiving and transmitting antenna means to produce an output signal whose amplitude approximates a normal radar target response, said output signal being transmitted as a cross-polarized response to the interrogating monopulse radar system.

6. A countermeasures system for the deception of a radar system of the type which transmits polarized electromagnetic energy, said countermeasures system comprising an electromagnetic energy radiator for radiating polarized waves, means for supplying to said radiator wave energy for transmission, said radiator operating to cause its radiated energy to be always polarized orthogonally to the polarization of a true radar return regardless of the polarization of the energy from said radar system incident on said countermeasures system.

7. A countermeasures system for deception of a radar system of the type which transmits linearly polarized electromagnetic energy, said countermeasures system comprising an electromagnetic energy radiator for radiating linearly polarized waves, means for supplying to said radiator wave energy for transmission, said radiator operating to cause its radiated energy to be always polarized orthogonally to the polarization of a true radar return regardless of the orientation of the plane of polarization of the energy from said radar system incident on said countermeasures system.

8. A countermeasures system for use in a vehicle to deceive a radar system which transmits energy toward said vehicle, said countermeasures system comprising in combination with said vehicle an electromagnetic energy radiator for radiating polarized waves, means for supplying to said radiator wave energy for transmission, said radiator operating to cause its radiated energy to have a substantial polarization component orthogonal to the polarization of the energy from said radar system incident on said countermeasures system.

References Cited in the file of this patent

UNITED STATES PATENTS

| | | |
|---|---|---|
| 2,362,832 | Land | Nov. 14, 1944 |
| 2,544,677 | Hammond et al. | Mar. 13, 1951 |